(12) United States Patent
Kirshenbaum

(10) Patent No.: US 8,539,349 B1
(45) Date of Patent: Sep. 17, 2013

(54) METHODS AND SYSTEMS FOR SPLITTING A CHINESE CHARACTER SEQUENCE INTO WORD SEGMENTS

(75) Inventor: Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1365 days.

(21) Appl. No.: 11/555,274

(22) Filed: Oct. 31, 2006

(51) Int. Cl.
*G06F 17/27* (2006.01)

(52) U.S. Cl.
USPC .................. 715/264; 704/8; 704/9; 704/10

(58) Field of Classification Search
USPC ..................... 704/8, 9, 10; 715/256, 264
See application file for complete search history.

(56) References Cited

U.S. PATENT DOCUMENTS

| | | | |
|---|---|---|---|
| 5,224,040 A | | 6/1993 | Tou |
| 5,448,474 A | | 9/1995 | Zamora |
| 5,664,206 A | * | 9/1997 | Murow et al. .................. 704/8 |
| 5,806,021 A | * | 9/1998 | Chen et al. .................... 704/9 |
| 6,049,869 A | * | 4/2000 | Pickhardt et al. ............. 712/300 |
| 6,173,252 B1 | * | 1/2001 | Qiu et al. ..................... 704/9 |
| 6,519,363 B1 | * | 2/2003 | Su et al. ..................... 382/177 |
| 6,694,055 B2 | * | 2/2004 | Wu ............................. 382/185 |
| 6,839,680 B1 | | 1/2005 | Liu et al. |
| 6,879,951 B1 | | 4/2005 | Kuo |
| 7,149,681 B2 | * | 12/2006 | Hu et al. ...................... 704/2 |
| 2002/0102025 A1 | | 8/2002 | Wu et al. |
| 2003/0101449 A1 | | 5/2003 | Bentolila et al. |
| 2005/0071148 A1 | | 3/2005 | Huang et al. |
| 2005/0154579 A1 | | 7/2005 | Izuha |
| 2005/0234707 A1 | | 10/2005 | Luo et al. |
| 2006/0204100 A1 | | 9/2006 | Dunn |
| 2008/0126176 A1 | | 5/2008 | Iguchi |

OTHER PUBLICATIONS

Shanjian Li, Katsuhiko Momoi, A Composite approach to language/encoding detection, Sep. 2001, Netscape Communications Corp.*
Pascale Fung, Dekai Wu, Statistical Augmentation of a Chinese Machine-Readable Dictionary, Jun. 7, 1994.*
Richard Sproat, Chilin Shih, William Gale, Nancy Chang, A stochastic Finite-State Word-Segmentation Algorithm for Chinese, 1996, Association for Computational Linguistics, vol. 22, No. 3.*
Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: "The Collective Intelligence Platform," Online, http://www.baynote.com/technology/platform/ 2010.

(Continued)

*Primary Examiner* — Stephen Hong
*Assistant Examiner* — Marshon Robinson

(57) ABSTRACT

Systems, methods and machine readable medium including machine readable code for splitting a Chinese character sequence into word segments are disclosed. A synchronization list including a plurality of Chinese words is provided. An input data string including a Chinese character sequence is received and one of the plurality of Chinese words from the synchronization list is identified in the Chinese character sequence. The identified Chinese word is defined as a word segment in the Chinese character sequence. An undefined character sequence is identified in the Chinese character sequence. The undefined character sequence is segmented into at least one word segment.

18 Claims, 7 Drawing Sheets

(56) References Cited

OTHER PUBLICATIONS

Hottolink Inc.; "Recognize" Online, http://www.hottolink.co.jp/english/reconize.html, 2009.

Andrejko et al.: "User Characteristics Acquisition from Logs with Semantics" 8. Slovak University of Technology in Bratislava.

Hongjun Lu et al: "Extending a Web Browser with Client-Side Mining," Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda An Accurate and Scalable Web based Recommendation System?" University of Southern California, Los Angeles, Sep. 2001.

WHY WUBAT? Website User Behavior & Analysis Tool, Wubat, Online, http://www.wubat.com/.

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking", 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

\* cited by examiner

METHODS AND SYSTEMS FOR SPLITTING A CHINESE CHARACTER SEQUENCE INTO WORD SEGMENTS

FIELD OF THE INVENTION

The present invention generally relates to Chinese language processing and more particularly to methods and systems for splitting a sequence of Chinese characters into word segments.

BACKGROUND OF THE INVENTION

Data mining applications routinely rely on an analysis of document specific features to perform document classification and/or clustering functions. Examples of such document specific features include, but are not limited to, the presence or absence of particular words in the document text and/or the number of instances that particular words or particular sequences of words appear in the document text. Document specific features are typically used to index documents. Search engines routinely identify specific documents that best match specific search queries based on the document specific features associated with each of the individual documents in an indexed document set.

In most languages, individual words within the written text are easily discernable because the words within the text are delimited by spaces or punctuation. Splitting document text into individual words in such languages is typically a fairly straightforward process. In the case of some languages however, such as for example the Chinese language, the written text does not include any indication of breaks between consecutive words. Chinese text typically consists of one or more consecutive sequences of characters that may include more than one word within a single character sequence. The reader typically infers the breaks between the Chinese words in the Chinese character sequence based on the context of the words within the Chinese character sequence.

One prior art data mining solution simply ignores the Chinese text present in a document and relies on the non-Chinese text (typically English text) that may be present within the body of the document to extract document specific features. However, documents that include only Chinese text cannot be processed using this particular prior art solution as this prior art solution lacks the ability to identify and process Chinese words.

Another prior art data mining solution treats each individual Chinese character within the Chinese text contained within a document as a separate feature. However, in some cases, a character may be a component of a number of different Chinese words. In many cases, the different Chinese words that share a common character have very little in common with each other. As a result, treating each individual Chinese character as a feature may lead to errors in document indexing.

Another prior art solution leverages the fact that most Chinese words are two characters long. Each consecutive two character string within a Chinese character sequence is treated as a word or feature. For example, if a Chinese character sequence includes a sequence of five characters, the first and second characters are treated as a first word, the second and third characters are treated as a second word, the third and fourth characters are treated as a third word, and the fourth and fifth characters are treated as a fourth word.

Another prior art data mining solution also leverages the fact that most Chinese words are two-characters long. Each Chinese character sequence is segmented into consecutive two-character words with the first character of each word starting with an odd number character within the Chinese character sequence. For example, if a character sequence includes six characters, the first and second characters are treated as a first word, the third and fourth characters are treated as a second word, and the fifth and sixth characters are treated as third word.

Since not all Chinese words are two characters long, the presence of a word with more that two characters, such as for example a three character word, can introduce errors into the mined data. Furthermore, the data mining application may capture a large number of non-words formed by combining the last character of a first two-character Chinese word with the first character of the next two-character Chinese word. The number of non-words captured by the data mining application may dwarf the number of actual Chinese words retrieved thereby affecting the accuracy of the indexing of the documents.

Another prior art data mining solution requires that the Chinese character sequences in a document be separated by some form of a word separation character in order to perform Chinese word related data mining functions. For example, the Unicode character set has a zero-width non-joiner character that is intended to be used as a word separation character to logically separate words that are not displayed with visible separation. While the use of word separation characters facilitates the splitting of Chinese text into Chinese words, most documents that include Chinese text do not use word separation characters. Most Chinese document generators, such as for example, Chinese typists, are typically not trained to use such word separation characters. This prior art data mining solution lacks the capacity to process Chinese text that does not include word separation characters.

Another prior art data mining solution recognizes Chinese words contained within a Chinese dictionary or list of known Chinese words to perform data mining operations. Chinese dictionaries are often large and incomplete making it impractical to fold the dictionary into a tool that can be transmitted over a network or stored on a small appliance. The use of Chinese dictionaries often requires a large amount of RAM to use the dictionary or a large number of accesses to a storage device storing the dictionary. Multiple accesses to a storage device may slow down the operations of a data mining application. New terms are also continually being added to the Chinese vocabulary, especially in technical areas. The use of an incomplete Chinese dictionary may result in the mining of irrelevant words and missing the mining of potentially relevant words in a document.

Thus what is needed is a system and method of splitting a Chinese character sequence into word segments that seeks to overcome one or more of the challenges and/or obstacles described above.

BRIEF DESCRIPTION OF THE DRAWINGS

The present invention is illustrated by way of example and not limited in scope to the accompanying figures, in which like reference numerals indicate similar elements, and in which.

DETAILED DESCRIPTION OF THE PREFERRED EMBODIMENTS

Figure 1:
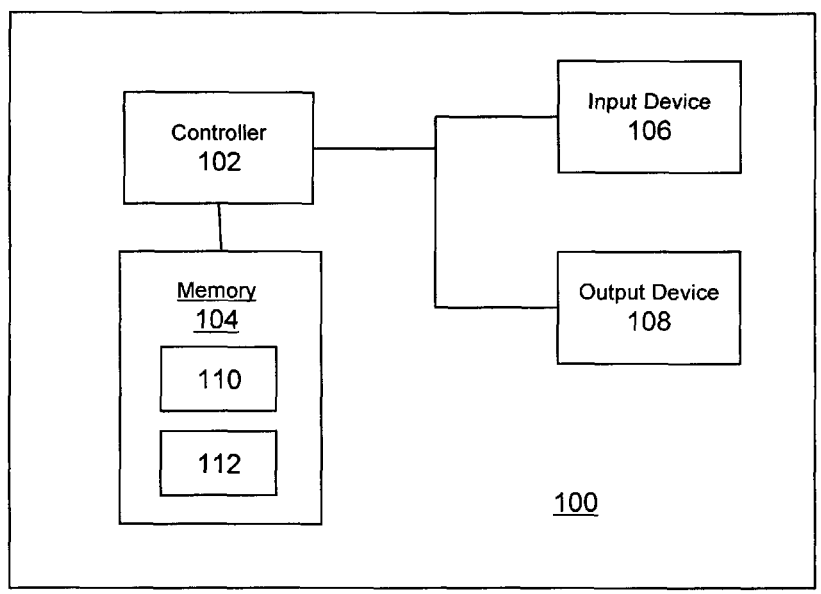
FIG. 1 is a block diagram of a system that may be used to implement one embodiment of a method of splitting a Chinese character sequence into word segments in accordance with the principles of the present invention.

Referring to FIG. 1, a block diagram of a system that may be used to implement one embodiment of a method of splitting a Chinese character sequence into word segments in accordance with the principles of the present invention is shown. Examples of devices that may include the system 100 include, but are not limited to, a personal computer and a personal digital assistant (PDA). In one embodiment, the system 100 generally includes a controller 102 communicatively coupled to a memory 104, an input device 106, and an output device 108. The controller 102 generally retrieves and executes machine readable instructions or software programs that are stored in the memory 104.

The memory 104 generally includes an operating system module 110 and a Chinese word segmentation module 112. The memory 104 may include additional application modules that may facilitate the operation of the system 100, the Chinese word segmentation functions and/or Chinese document management functions. The memory 104 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices.

The controller 102 is communicatively coupled to one or more input devices 106 and one or more output devices 108. Examples of input devices 106 include, but are not limited to, a scanner, a memory storage device reader, a keyboard, and a mouse. In one embodiment, one or more input/output interfaces are provided to enable data transfer between the controller 102 and other devices, such as for example, one or more of a cellular telephone, a personal assistant device (PDA), and another personal computer. In another embodiment, an input/output interface is provided to the Internet. Examples of output devices 108 include, but are not limited to, a display screen and a printer.

Figure 2:
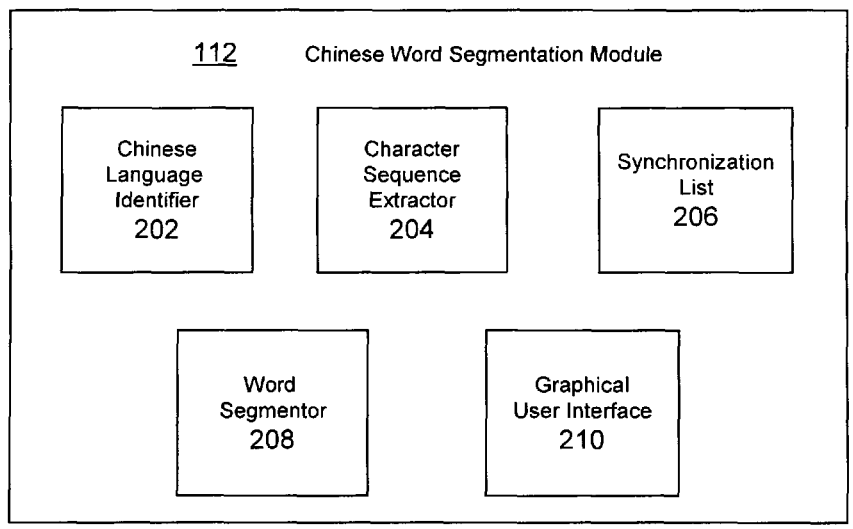
FIG. 2 is a block diagram of one embodiment of a Chinese word segmentation module in accordance with the principles of the present invention.

Referring to FIG. 2, a block diagram of one embodiment of a Chinese word segmentation module in accordance with the principles of the present invention is shown. The Chinese word segmentation module 112 receives a document in the form of an input data string for processing. The Chinese word segmentation module 112 extracts the Chinese character sequences present in the input data string and segments each of the extracted Chinese character sequences into consecutive word segments. A word segment is a sequence of characters that is treated as a word.

One embodiment of the Chinese word segmentation module 112 generally includes a Chinese language identifier 202, a character sequence extractor 204, a synchronization list 206, a word segmentor 208, and a graphical user interface 210. Alternative embodiments of the Chinese word segmentation module 112 include a synchronization list 206 and a word segmentor 208 as basic components of the Chinese word segmentation module 112 and optionally include one or more of a Chinese language identifier 202, a character sequence extractor 204, and a graphical user interface 210.

In one embodiment, the Chinese language identifier 202, the character sequence extractor 204, the synchronization list 206, the word segmentor 208, and the graphical user interface 210 are all included within a single device. In another embodiment, the Chinese language identifier 202, the character sequence extractor 204, the synchronization list 206, the word segmentor 208, and the graphical user interface 210 are distributed over one or more communicatively coupled devices.

The Chinese language identifier 202 generally determines whether a document received in the form of an input data string for word segmentation includes one or more Chinese character sequences. The Chinese language identifier 202 determines whether there is any data to support whether the document language might be Chinese, in other words, whether there are any characters in the document that could be Chinese characters. The use of a Chinese language identifier 202 is unnecessary in those cases where the source of the document is known to be a source of documents that have a relatively high likelihood of containing Chinese text, such as for example, China, Taiwan and/or companies that primarily use Chinese text in their documents.

In one embodiment, the Chinese language identifier 202 first determines whether a document received for Chinese word segmentation, contains characters that could potentially be Chinese characters. Unicode supports the encoding of text in a large number of languages including Chinese Japanese and Korean. The character set that is used for processing a document may be the same as or different from the character set that used to encode the document. The Chinese language identifier 202 determines whether the character set that was used to process the received document is Unicode. The Chinese language identifier 202 reviews the received document to determine whether the document contains characters from the Unicode "CJK Ideographs Area (characters U+4E00 through U+9FFF) or similar ranges of characters specified as representing "unified" Chinese, Japanese, and Korean ("CJK") characters that are similarly shaped and/or historically related. Such characters are represented by identical numerical codes. If no such characters are present in the received document, the Chinese language identifier 202 determines that the document is not a Chinese language document and that the input data string does not contain a Chinese character sequence. If such characters are present in the received document, further processing is necessary to determine whether the characters are intended to be interpreted as Chinese characters, as opposed to identically encoded Japanese or Korean characters.

If a determination has not been made regarding whether the received document includes Chinese character sequence, the Chinese language identifier 202 performs a review of external data associated with the document to determine whether the document contains one or more Chinese character sequences. If there is no external data available for review or if the Chinese language identifier 202 determines that the external data does not provide an indication of whether the document contains one or more Chinese character sequences, the Chinese language identifier 202 identifies and/or reviews the character set used to encode the document as a whole to determine whether the document contains one or more Chinese character sequences. If identification and/or review of the character set used to encode the document is insufficient to make a determination regarding whether the document contains one or more Chinese character sequences, the Chinese language identifier 202 examines the specific characters contained within the input data string representation of the document to attempt to make a determination.

The Chinese language identifier 202 determines whether there is any external data associated with the document that provides an indication that the input data string is likely to contain one or more Chinese character sequences. Examples of external data include, but are not limited to, metadata indicating an author known to generate Chinese documents, a document source that is known to generate Chinese documents, location in a repository known to contain Chinese documents, and metadata indicating that the input data string includes Chinese text. Examples of such metadata include, but are not limited to, email headers including a "Content-Language Header" specified by RFC 3282, an HTTP response including a Content-Language specification, or an HTML "meta http-equiv" tag asserting a "Content-Language" header equivalence. The three mentioned examples are ways at getting at a "Content-Language" specification (e-mail header, HTTP response header, and HTTP-equiv in the body of an HTML document). Another source of metadata indicating that the input data string includes Chinese text is a "lang" attribute on an enclosing HTML tag or similar XML tag. If the review of the external data provides an indication that the input data string associated with the received document contains one or more Chinese character sequences, the input data string is forwarded to the character sequence extractor 204.

The Chinese language identifier 202 determines whether the character set used to encode the document supports the encoding of Chinese characters but does not support or is not primarily used to support the encoding of Korean and Japanese characters. Examples of such character sets that are primarily intended for encoding Chinese characters include, but are not limited to, the Big 5 character set, and the GB character set. If the Chinese language identifier 202 determines that the document is encoded in a character set that is primarily intended for encoding Chinese characters, the input data string is forwarded to the character sequence extractor 204.

Japanese text typically includes hiragana and/or katakana characters. The Chinese language identifier 202 determines whether the input data string includes one or more hiragana and/or katakana characters. If the Chinese language identifier 202 determines that the input data string includes one or more hiragana and/or katakana characters, the Chinese language identifier 202 determines that the document is a Japanese document and that the input data string does not include a Chinese character sequence. In an alternative embodiment, the Chinese language identifier 202 determines a ratio of the number of hiragana and katakana characters to the total number Unicode Chinese/Japanese/Korean characters present in the input data string. If the ratio is a relatively low number indicating that the document may be a Chinese document that includes Japanese excerpts, the input data string is forwarded to the character sequence extractor 204.

Korean text typically includes hangul characters. The Chinese language identifier 202 determines whether the input data string includes one or more hangul characters. If the Chinese language identifier 202 determines that the input data string includes one or more hangul characters, the Chinese language identifier 202 determines that the document is a Korean document and that the input data string does not include a Chinese character sequence. If the Chinese language identifier 202 determines that the input data string does not include any hangul characters, the Chinese language identifier 202 forwards the input data string to the character sequence extractor 204. In an alternative embodiment, the Chinese language identifier 202 determines whether a ratio of the number of hangul characters to the total number of Unicode Chinese/Japanese/Korean characters present in the document. If the ratio is a relatively low number indicating that the document may be a Chinese document that includes Korean excerpts, the input data string is forwarded to the character sequence extractor 204.

The character sequence extractor 204 identifies and extracts Chinese character sequences present in the input data string for word segmentation. Each Chinese character sequence consists of a consecutive string of Chinese characters. More specifically, the character sequence extractor 204 detects non-Chinese characters embedded in the input data string. Since Chinese words consisting of multiple characters are unlikely to span a non-Chinese character boundary, the character sequence extractor 204 detects the Chinese character sequences disposed between consecutive non-Chinese characters and extracts such Chinese character sequences for word segmentation. Examples of non-Chinese characters include, but are not limited to, punctuation symbols, numerals, English text, non-Chinese language text, and document mark up, such as for example, HTML tags.

The synchronization list 206 generally includes a list of commonly used Chinese words. In one embodiment, the synchronization list 206 includes commonly used single character Chinese words and commonly used multi-character Chinese words that have more than two characters. In another embodiment, the synchronization list 206 includes commonly used single character Chinese words and commonly used Chinese multi-character words that have two or more characters. In one embodiment, the synchronization list 206 includes a list of Chinese words that are specific to a particular subject matter and/or industry. In one embodiment, the synchronization list 206 includes a list of Chinese number words that are specifically identified as number words. A consecutive sequence of number words is typically used to define a complex number word. In another embodiment, the synchronization list 206 includes a list of Chinese classifier words that are specifically identified as classifier words. Classifier words are words that in most cases only follow a Chinese number word. In another embodiment, the synchronization list 206 includes a plurality of Chinese family name words. Chinese family name words are typically followed by two character given name words. In one embodiment, the Chinese family name and the given name are defined as two different word segments. In one embodiment, the Chinese family name and the given name are defined together as a single word segment.

The word segmentor 208 generally segments each of the Chinese character sequences extracted from the input data string by the character sequence extractor 204 into word segments. The word segmentor 208 identifies words from the synchronization list 206 that are present in the Chinese character sequence and the identified words are defined as word segments. In one embodiment, the word segmentor 208 analyzes one or more characters immediately following an identified word to determine whether the one or more characters constitute another word. For example, in one embodiment, the synchronization list 206 includes a listing of Chinese family names. When the word segmentor 208 identifies a Chinese family name in a Chinese character sequence, the word segmentor identifies the two characters immediately following a family name as a Chinese given name. The word segmentor 208 also identifies undefined character sequences in the Chinese character sequence. Undefined character sequences are character sequences in a Chinese character sequence that do not include a segmented word from the synchronization list 206 and/or a segmented word associated with a word from the synchronization list 206. The word segmentor 208 segments each of the identified undefined character sequences in the Chinese character sequence into word segments. The word segments in the undefined character sequence are treated as words regardless of whether the word segments actually define Chinese words.

The graphical user interface 210 is used to create an original version of the synchronization list 206. In one embodiment, the graphical user interface 210 enables a user to modify an existing synchronization list 206 based on a review of a document that has been segmented using the Chinese word segmentation module 112. In one embodiment, the graphical user interface 210 enables a user to provide suggestions for modifications to the synchronization list 206 based on a review of a document that has been segmented using the Chinese word segmentation module 112. The user supplied suggestions are stored for future review by a Chinese language expert. In one embodiment, a Chinese language expert makes the determination regarding whether to actually modify the synchronization list 206 in accordance with the user supplied feedback. In one embodiment, the graphical user interface 210 enables a user to identify words in a document, which is used, along with other documents, to automatically generate the synchronization list 206.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

Figure 3A:
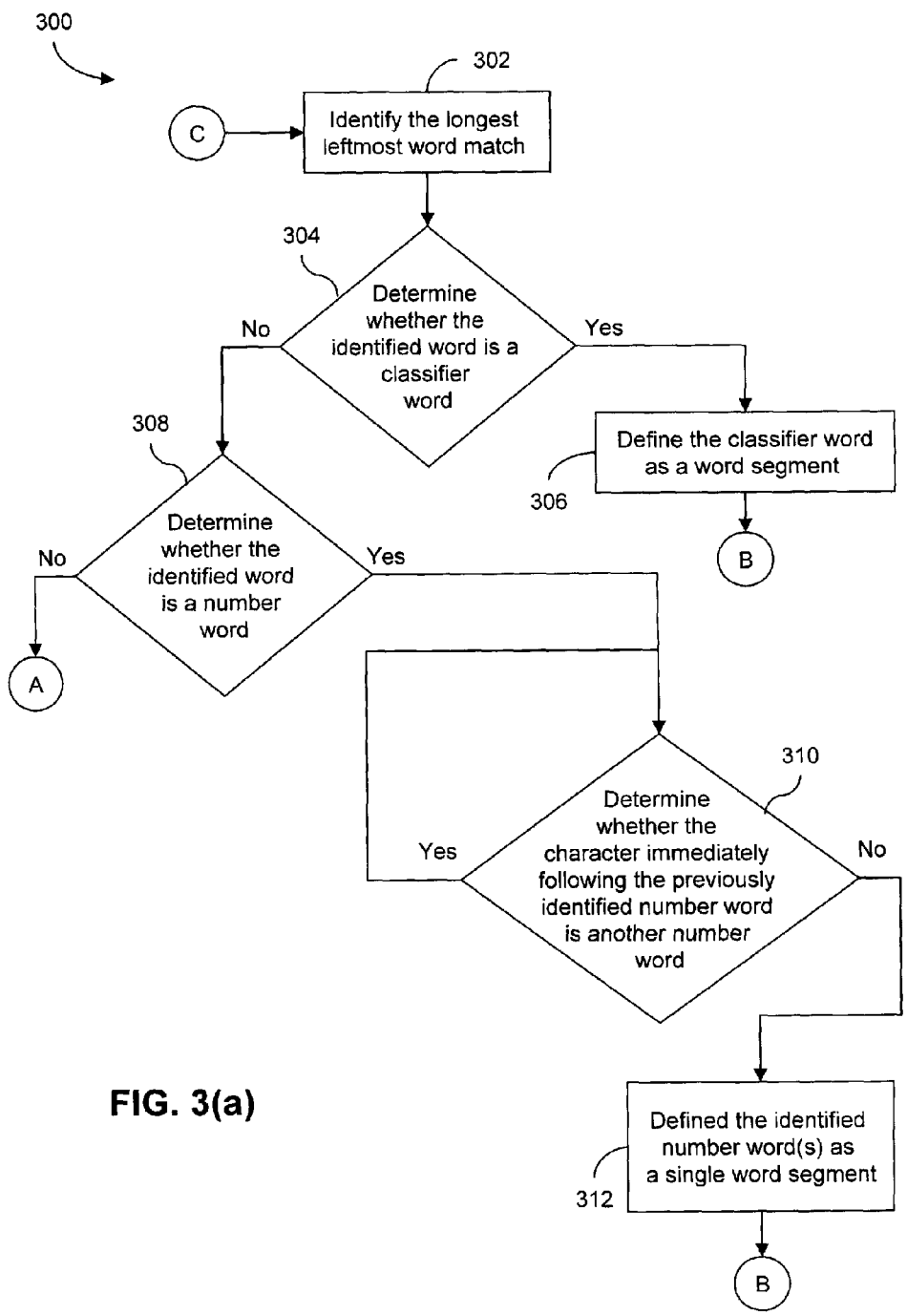
FIG. 3(a)-(b) is a flowchart of one embodiment of a method of segmenting words in a Chinese character sequence in accordance with the principles of the present invention.
Figure 3B:
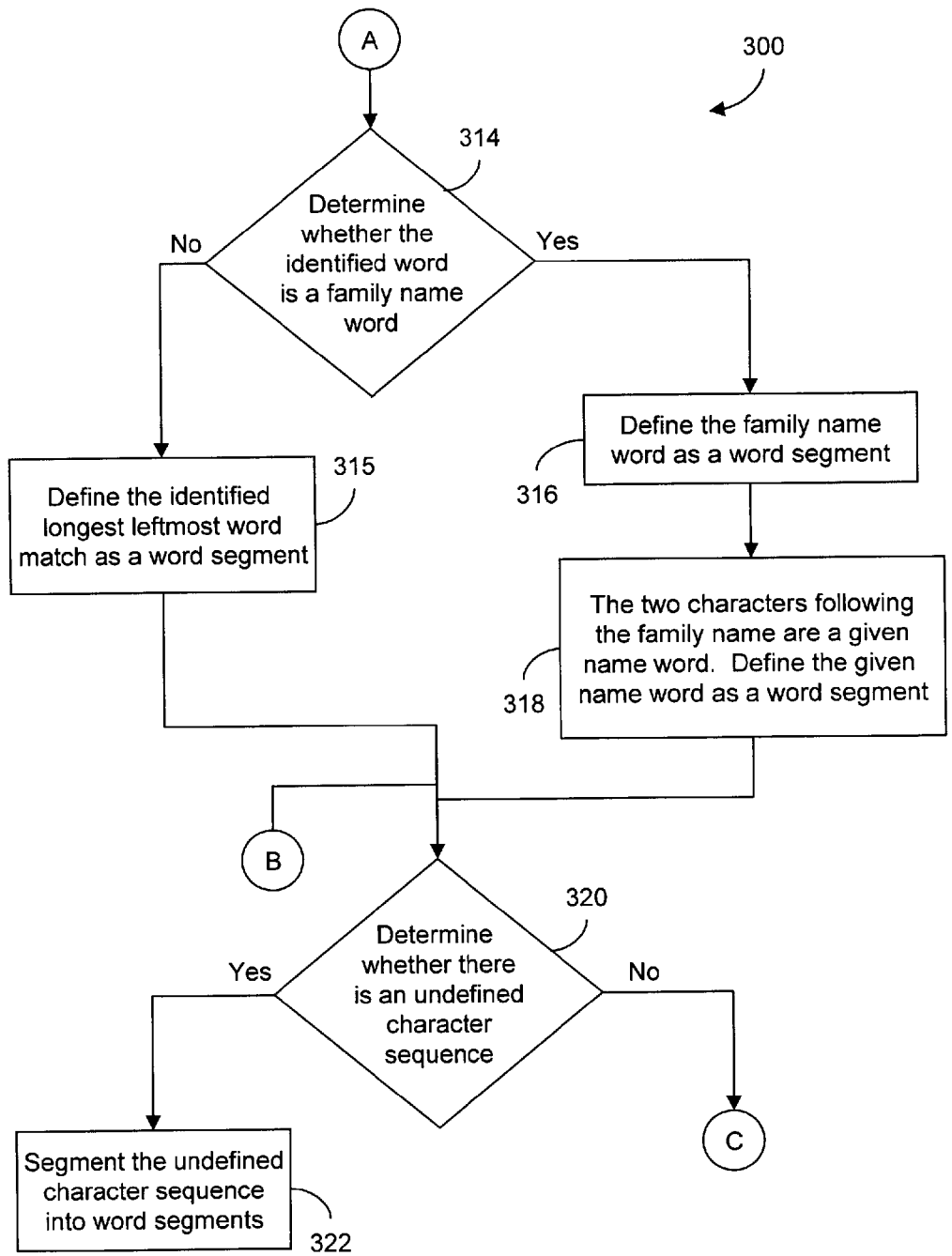

Referring to FIG. 3(a)-(b), a flowchart of one embodiment of a method of segmenting words in a Chinese character sequence in accordance with the principles of the present invention is shown. As mentioned previously, the word segmentor 208 segments each of the Chinese character sequences extracted from the input data string by the character sequence extractor 204 into word segments.

The synchronization list 206 includes a plurality of Chinese words. Some of the Chinese words in the synchronization list 206 are longer than other Chinese words. In some instances, the character strings of some of relatively short words are at the beginning of and contained within the character strings of other relatively longer Chinese words. At step 302, the word segmentor 208 identifies the longest leftmost match of a word from the synchronization list 206 in the Chinese character sequence. When at least one word segment has already been defined in the Chinese character sequence, the longest leftmost match is to the right of the previously identified word segments. The method then proceeds to step 304. An illustrative example using English words that are not separated by spacing is used to describe the concept of one embodiment of a longest leftmost word match. Suppose the example synchronization list 206 includes the words "mat," "matte," and "matter" and does not include the word "fusha." The longest leftmost word match from the synchronization list 206 that is present in a character sequence "fushamattewasusedinframingpicture" is the word "matte." If the word segmentor 208 first detects the presence of the word "mat," the word segmentor 208 would continue to compare the character sequence against the synchronization list 206 for words that begin with the character string "mat." While the word "mat" is a first match, it is not the longest leftmost match. Upon detection of the word "matte" in the character sequence, the word segmentor 208 would continue to compare the character sequence against the synchronization list 206 for a longer word match. Since the word "matter" is not a match, the word segmentor 208 would identify the longest leftmost word match from the synchronization list 206 in the character sequence to be the word "matte." In another embodiment, the word segmentor 208 identifies the longest rightmost match, in which case the undefined character sequence follows the identified right longest match of a word from the synchronization list 206. When at least one word segment has already been defined in the Chinese character sequence, the longest rightmost match is to the left of the previously identified word segments. In one embodiment, the synchronization list 206 includes a likelihood parameter associated with each word in the synchronization list 206, the likelihood parameter indicating the likelihood of the associated word being present in a Chinese character sequence. The likelihood parameter is used to make a decision when overlapping words are identified in a Chinese character sequence. For example, using English characters for purposes of illustration, if an example character sequence includes the characters "xyABCz," and "AB" and "BC" happen to be words included in the synchronization list 206, the likelihood parameter associated with the "AB" and "BC" would be used to select the word that is more likely to appear in a character sequence for identification as a word segment.

The synchronization list 206 includes a list of Chinese classifier words that are specifically identified as classifier words. A Chinese classifier word, in most cases, will only follow a Chinese number word. In fact, a Chinese classifier word is typically not defined as a Chinese word unless the Chinese classifier word follows a Chinese number word. At step 304, the word segmentor 208 determines whether the Chinese word from the synchronization list 206 identified as being present in the Chinese character sequence is a Chinese classifier word. If the identified word is a Chinese classifier word, the word segmentor 208 determines whether the identified Chinese classifier word is immediately preceded by a Chinese number word from the synchronization list 206 in the Chinese character sequence. If the word segmentor 208 determines that the identified Chinese classifier word is preceded by a Chinese number word, the word segmentor 208 defines the identified Chinese classifier word as a word segment in the Chinese character sequence at step 306 and the method 300 proceeds to step 320. If the word segmentor 208 determines that the identified Chinese word is not a Chinese classifier word, the method 300 proceeds to step 308. In one embodiment, the identified Chinese classifier word can only be defined as a word if the classifier word is preceded by a number word. In which case, if the word segmentor 208 determines that the classifier word is not preceded by a number word, the identified word is not segmented as a word segment and the method 300 returns to step 302 to find the next longest leftmost word match.

The synchronization list 206 includes a list of Chinese number words that are specifically identified as number words. Chinese number words are words that represent numbers, such as for example, the numbers one, five, hundred, etc. Chinese number words are typically single character words, but often appear in sequence to define more complex numbers. At step 308, the word segmentor 208 determines whether the identified Chinese word is a Chinese number word. If the word segmentor 208 determines that the identified Chinese word is a Chinese number word, the word segmentor 208 determines whether the character immediately following the identified Chinese number word is another Chinese number word from the synchronization list 206 at step 310. If the word segmentor 208 determines that the character immediately following the previously identified Chinese number word is not another Chinese number word, the word segmentor 208 defines the identified Chinese number word as a word segment at step 312 and the method 300 proceeds to step 320. If the word segmentor 208 determines that the character immediately following the previously identified Chinese number word is another Chinese number word, the word segmentor 208 repeats step 310. The word segmentor 208 repeats step 310 until all of the single character Chinese number words from the synchronization list 206 defining the complex Chinese number word in the Chinese character sequence have been identified. The consecutive sequence of identified Chinese number words defining the complex Chinese number in the Chinese character sequence are defined as a single word segment at step 312 and the method 300 proceeds to step 320.

In one embodiment, Chinese classifier words are not considered when looking for the longest leftmost word match in step 402. The word segmentor 208 analyzes the character immediately following a Chinese number word segment identified in step 312 to determine whether that character is a Chinese classifier word. If the word segmentor 208 determines that the character immediately following a segmented Chinese number word is a Chinese classifier word, the word segmentor 208 defines the Chinese classifier word as a word segment.

If the word segmentor 208 did not define the identified Chinese word from the synchronization list 206 as a Chinese classifier word at step 304 or a Chinese number word at step 308, the word segmentor 208 determines whether the identified Chinese word is a family name word at step 314. The synchronization list 206 includes a plurality of Chinese family name words. Chinese family name words are typically followed by two character given name words. In one embodiment, if the word segmentor 208 determines that the identified Chinese word is a family name word from the synchronization list 206, the family name word is defined as a word segment at step 316 and the two characters in the Chinese character sequence immediately following the Chinese family name word are assumed to be a Chinese given name and defined as a word segment at step 318. In another embodiment, the characters in the family name word and the characters in the given name word are identified together as a single word segment. If the word segmentor 206 determines that the identified word is not a Chinese family name word from the synchronization list 206 at step 314, the word segmentor 208 defines the identified word match from step 302 as a word segment in the Chinese character sequence at step 315. The method 300 then proceeds to step 320.

The method 300 arrives at step 320 once the longest leftmost word match from the synchronization list 206 has been properly analyzed to define one or more word segments associated with the identified word match in the Chinese character sequence. At step 320, the word segmentor 208 determines whether there is an undefined character sequence immediately preceding the word segment(s) defined by steps 302 through 318 in the Chinese character sequence. The undefined character sequence does not include any defined word segments. In another embodiment, the word segmentor 208 identifies the longest rightmost, in which case the undefined character sequence follows the identified right longest match of a word from the synchronization list 206.

When the longest leftmost word match from step 302 begins with the first character in the Chinese character sequence or the first character in the Chinese character sequence following a previously identified word segment, the word segmentor 208 determines that there is no undefined character sequence preceding the word segments that have been defined in accordance with the longest leftmost word match in the Chinese character sequence. The method 300 returns to step 302 to identify the next longest leftmost word match in the Chinese character sequence.

When the current longest leftmost word match from step 302 is preceded by the immediately previous longest leftmost word match in the Chinese character sequence, the undefined character sequence begins with the first Chinese character immediately following the last word segment associated with immediately previous longest leftmost word match and ends with the Chinese character immediately preceding the first character of the current longest leftmost word match.

The word segmentor 208 determines that there is an undefined character sequence in the Chinese character sequence at step 320 and segments the undefined character sequence at step 322. A method 400 of segmenting the undefined character sequences in accordance with the principles of the present invention is described with reference to FIG. 4 below. The method 300 returns to step 302 to identify the longest leftmost word match in the remainder of the Chinese character sequence.

When the word segmentor 208 is unable to identify any further words from the synchronization list 206 in the Chinese character sequence, the word segmentor 208 determines whether there is an undefined character sequence following the last defined word segment in the Chinese character sequence at step 320. If the word segmentor 208 determines that there is an undefined character sequence following the last defined word segment in the Chinese character sequence at step 320 and the word segmentor 208 segments the undefined character sequence at step 322. The segmentation of the Chinese character sequence is then complete. In the embodiment where the longest rightmost match technique is used to identify words from the synchronization list 206 that are present in the Chinese character sequence, when the word segmentor 208 is unable to identify any additional words from the synchronization list 206 in the Chinese character sequence, the word segmentor 208 determines whether there is an undefined character sequence preceeding the last defined word segment in the Chinese character sequence at step 320.

It should be noted that while the steps in the method 300 have been described in a particular order, performing one or more of the steps in a different order or simultaneously, or performing a subset of the described steps are also considered to be within the scope of the invention. In one embodiment, the method 300 is implemented using regular expressions. Alternative embodiments using alternative pattern matching techniques known to one skilled in the art may be used without departing from the spirit of the invention. In an alternative embodiment, the Chinese words are first identified and defined as word segments in the Chinese character sequence using the synchronization list. The undefined character sequences are identified following the definition of the word segments using the synchronization list. The undefined character sequences within the Chinese character sequence are the remaining unsegmented character sequences following the identification of word segments using the synchronization list.

Figure 4:
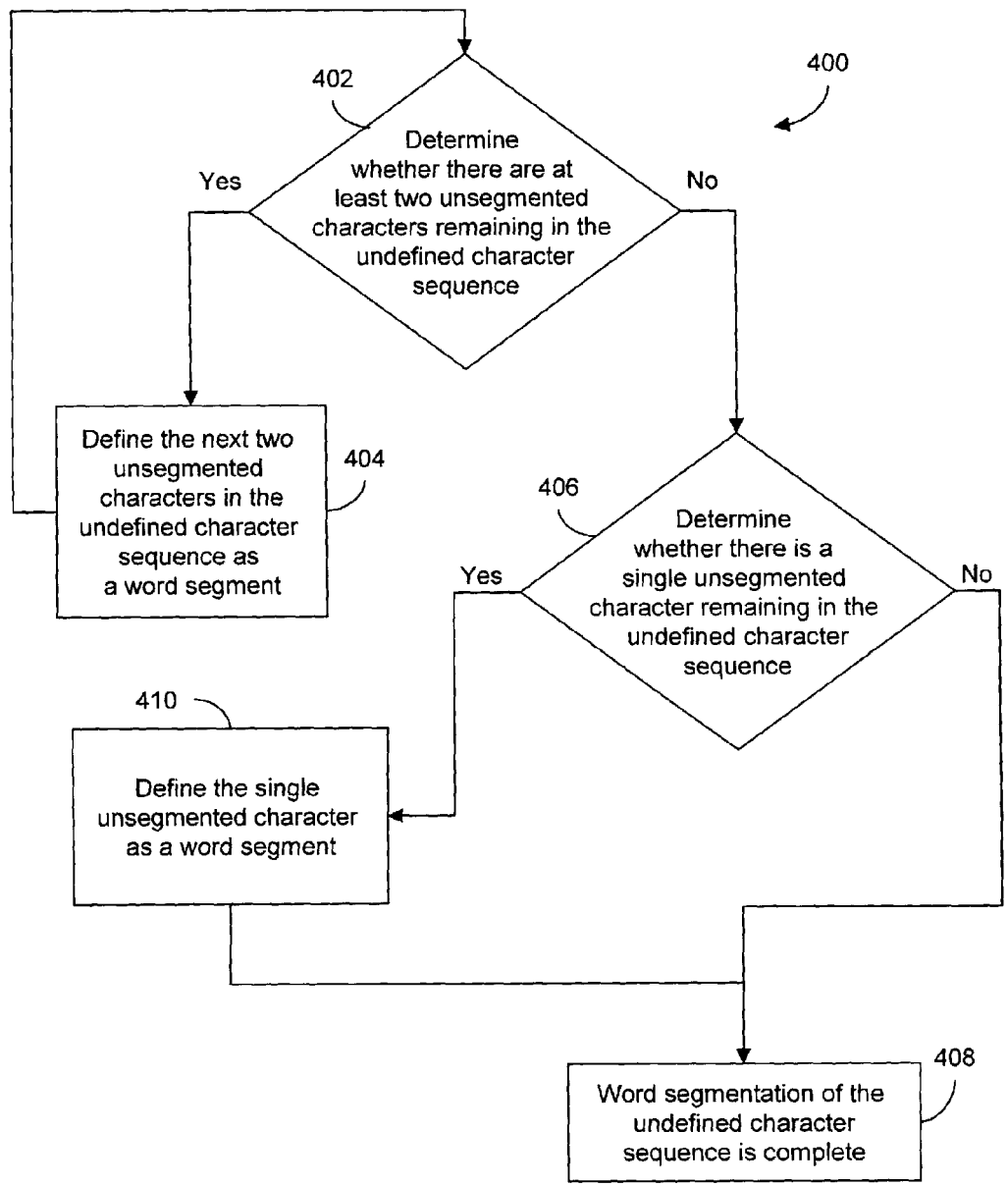
FIG. 4 is a flowchart of one embodiment of a method of splitting an undefined character sequence in a Chinese character sequence into word segments in accordance with the principles of the present invention.

Referring to FIG. 4, a flowchart of one embodiment of a method of splitting an undefined character sequence in a Chinese character sequence into word segments in accordance with the principles of the present invention is shown. When the undefined character sequence includes a single character, the word segmentor 208 segments the single character into a single character word segment. When the undefined character sequence includes an even number of characters, the word segmentor 208 segments the undefined character sequence into consecutive two character word segments. When the undefined character sequence includes an odd number of characters and three or more characters, the word segmentor 208 segments the undefined character sequence into consecutive two character word segments and segments the single remaining character as a single character word segment.

The method 400 begins at step 402 with the word segmentor 208 determining whether there are at least two unsegmented characters remaining in the undefined character sequence. If the word segmentor 208 determines that the undefined character sequence does not include at least two unsegmented characters, the undefined character sequence contains a single character and the method 400 proceeds to step 406. If the word segmentor 208 determines that there are at least two unsegmented characters remaining in the undefined character sequence, the word segmentor 208 segments the first two consecutive unsegmented characters in the undefined character sequence as a word segment at step 404.

The method 400 then returns to step 402 again and the word segmentor 208 determines whether there are still two unsegmented characters remaining in the undefined character sequence. If the word segmentor 208 determines that there are still two unsegmented characters remaining in the undefined character sequence, the word segmentor 208 segments the two consecutive characters immediately following the previously segmented word. The method repeats steps 402 and 404 until all of the consecutive two character strings in the undefined character sequence have been segmented into word segments and the word segmentor 208 determines that there are no longer at least two unsegmented characters remaining in the undefined character sequence at step 402. The method 400 then proceeds to step 406.

At step 406, the word segmentor 208 determines whether there is a single character remaining in the undefined character sequence. If the word segmentor 208 determines that a single unsegmented character does not remain in the undefined character sequence, the word segmentation of the undefined character sequence is complete at step 408. A single unsegmented character will not remain when the undefined character sequence includes an even number of characters. If the word segmentor 208 determines that a single unsegmented character remains in the undefined character sequence, the word segmentor 208 defines the single character as a single character word segment at step 410 and the word segmentation of the undefined character sequence is complete at step 408. A single character will remain in the undefined character sequence when the undefined character sequence includes an odd number of characters. In an alternative embodiment, the first character of an undefined character sequence having an odd number of characters is segmented as a single character word and the consecutive two string characters that follow are segmented into two character words.

It should be noted that while the steps in the method 400 have been described in a particular order, performing one or more of the steps in a different order, or performing a subset of the described steps are also considered to be within the scope of the invention. While one embodiment of segmenting an undefined character sequence has been described, alternative methods of segmenting an undefined character sequence are also considered to be within the scope of the invention. Segmenting the undefined character sequence into alternative word segment lengths are also considered to be within the scope of the invention.

Figure 5:
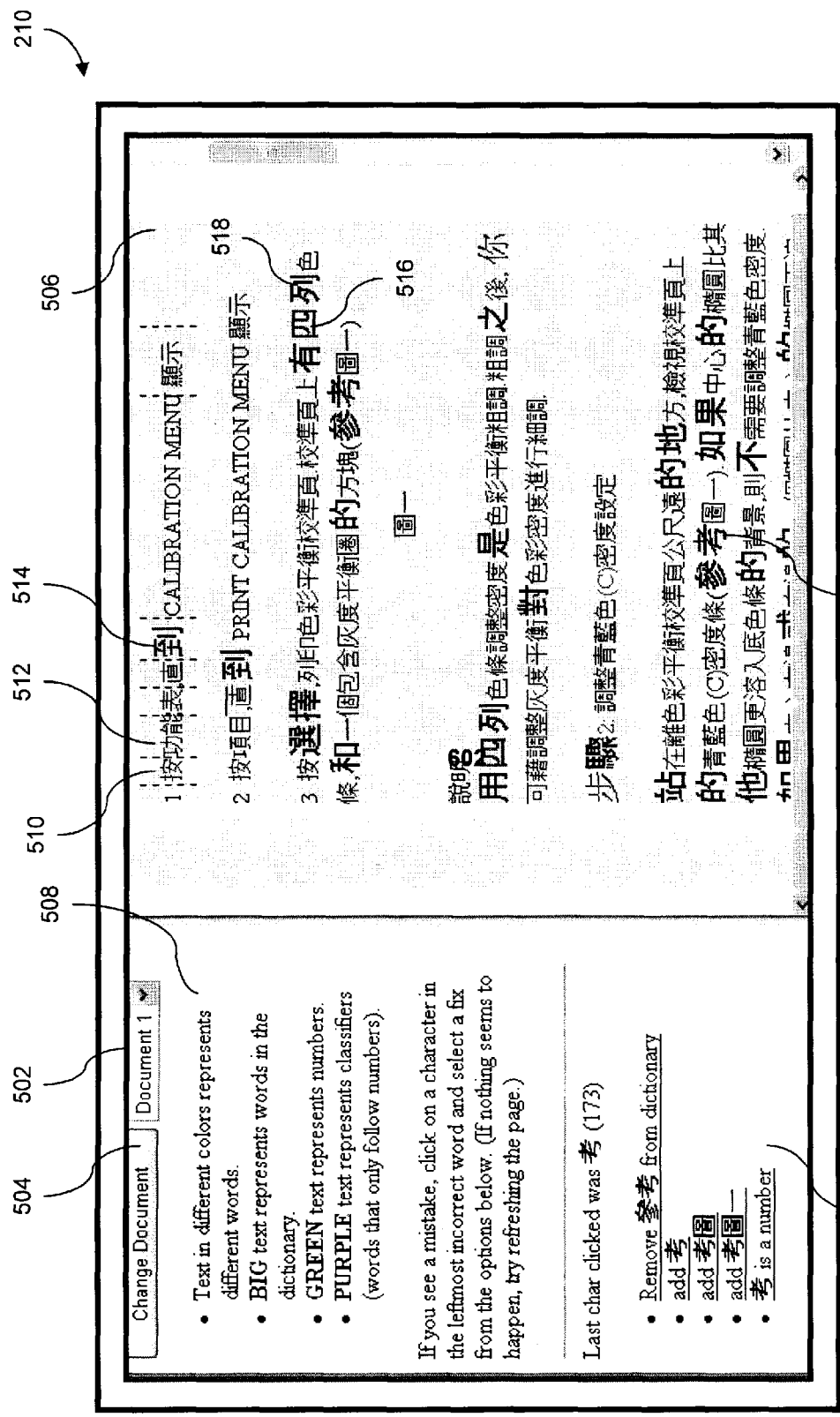
FIG. 5 is an illustration of one example of one embodiment of a graphical user interface that may be used to receive user feedback regarding the word segmentation of Chinese character sequences in a selected document in accordance with the principles of the present invention.

Referring to FIG. 5, an illustration of one example of a graphical user interface 210 that may be used to receive user feedback regarding the word segmentation of Chinese character sequences in a selected document in accordance with the principles of the present invention is shown.

The graphical user interface 210 includes a drop down document selection menu 502 and a change document button 504. The drop down document selection menu 502 enables a user to display a list of a number of different documents that include Chinese character sequences. Once the user selects a specific document from the drop down document selection menu 502, the user clicks on the change document button 504, and the selected document is segmented on the fly and displayed in the document display field 506. In other embodiments, alternative mechanisms for selecting documents may be used.

The graphical user interface 210 includes a word segment description field 508 that defines the manner in which the segmented Chinese words in the selected document are displayed in the document display field 506. While the word segmentation description field has been described as component of the GUI, word segmentation description fields 508 that alternatively contained in GUI-related documentation and/or available in an on-line help facility are also considered to be within the scope of the invention. The word segment description field 508 indicates that the different word segments 510, 512 are displayed in different colors. For example, alternating word segments 510, 512 may be displayed in alternating red text 510 and blue text 512 (for illustration purposes, the different word segments 510, 512, 514 in the first line of displayed Chinese text are separated by dashed lines). The word segments 514 created based on matches with words from the synchronization list 206 are displayed in an enlarged text size. The word segments 510, 512 created as a result of the segmentation of undefined character sequences are displayed in normal size text. The Chinese number word segments 516 from the synchronization list 206 are displayed in green text and the Chinese classifier word segments 518 from the synchronization list 206 are displayed in purple text. Both the Chinese number word segments 516 and the Chinese classifier word segments 518 are also displayed in enlarged text since the Chinese number word segments 516 and Chinese classifier word segments 518 are also words associated with the synchronization list 206.

The graphical user interface 210 includes a synchronization list update field 520 that provides the user with the option of adding words to the synchronization list 206, removing words from the synchronization list 206, and/or reclassifying words in the synchronization list 206. To modify the synchronization list 206, the user first selects a Chinese character 522 from the Chinese characters displayed in the selected document in the document display field 506. The selected Chinese character 522 is displayed in the synchronization list update field 520. In this example, the user is provided with a number of different options: removing the word segment containing the selected Chinese character from the synchronization list 206, adding the selected Chinese character as a single character word to the synchronization list 206, adding the selected character and the character immediately following the selected character as a two character word to the synchronization list 206, adding the selected character and the two characters immediately following the selected character as a three character word to the synchronization list 206, and classifying the selected character as a number word in the synchronization list 206. While a number of examples of options available to a user for updating the synchronization list 206 via the graphical user interface 210 have been described, alternative options for updating the synchronization list 206, such as for example, classifying a selected character as a classifier word or as a Chinese family name in the synchronization list 206, are also considered to be within the scope of the invention. In another embodiment, alternative mechanisms for identifying characters and indicating updates, such as for example, including but not limited to using context sensitive menus or "drag-and-drop," are also considered to be within the scope of the invention.

Once a user indicates an update to the synchronization list 206, the synchronization list 206 is modified in accordance with the user supplied update. The selected document is re-segmented using the updated synchronization list 206, and the selected document is displayed with the results of the re-segmentation in the document display field 506. The user is provided with the option of indicating a further update to the synchronization list 206, and the document re-segmentation process described above is repeated. Re-segmenting the selected document iteratively responsive to each update to the synchronization list 206 has the effect of correcting and/or facilitating the correction of other word segmentation errors associated with the user-provided update that may be present in the selected document.

In one embodiment, the synchronization list 206 is constructed based on an analysis of a corpus of previously segmented Chinese documents. In one embodiment, the corpus of previously segmented Chinese documents is created using Chinese documents that have been segmented in accordance with user specific updated synchronization lists. In one embodiment the corpus of previously segmented Chinese documents is created using Chinese documents that have been correctly segmented by one or more Chinese language experts. In one embodiment, the corpus of previously segmented Chinese documents is created using Chinese documents that have been segmented using a Chinese dictionary. In one embodiment, two or more of the techniques described above are combined to generate a corpus of previously segmented Chinese documents.

In one embodiment, the previously segmented corpus of Chinese documents is used to identify Chinese words as synchronization list word candidates. Synchronization list word candidates are Chinese words that are selected for consideration for addition to the synchronization list 206. In one embodiment, a pre-defined frequency threshold is used to identify the Chinese words as synchronization list word candidates. In one embodiment, only the Chinese words having less than a pre-defined character sequence length are considered in identifying the Chinese words as synchronization list word candidates. In one embodiment, a Chinese dictionary is used as a source for selectively identifying Chinese words as synchronization list word candidates. In one embodiment, the described techniques may be combined to generate a list of words as synchronization list word candidates.

In one embodiment, a Chinese language expert reviews the plurality of words identified as synchronization list word candidates and specifically identifies the Chinese number words, the Chinese classifier words, and the Chinese family name words. In one embodiment, the user specific updated synchronization lists 206 are used to analyze the plurality of words identified as synchronization list word candidates and specifically identify the Chinese number words, the Chinese classifier words, and the Chinese family name words. In one embodiment, a Chinese language dictionary is used to specifically identify the Chinese number words, the Chinese classifier words, and the Chinese family name words in the plurality of words identified as synchronization list word candidates. In one embodiment, one or more of the described techniques may be combined to specifically identify the Chinese number words, the Chinese classifier words, and the Chinese family name words in the plurality of words identified as synchronization list word candidates.

Using the previously segmented corpus of Chinese documents and the plurality of Chinese words that have been identified as synchronization list word candidates, an optimization technique is used to generate the synchronization list 206. The optimization technique is used to derive a synchronization list 206 that substantially minimizes a cost function based on a cost for including each of the plurality of identified Chinese words in the synchronization list 206 and a cost for erroneously identifying each of the Chinese words and/or failing to identify each of the Chinese words when the synchronization list 206 is used to identify word segments on one or more of the documents in the segmented corpus of Chinese documents. In one embodiment, a base synchronization list is provided, and the optimization is performed subject to the constraint that the elements on the base synchronization list must be maintained in the optimized solution. Any one of a number of different optimization techniques that are known to one skilled in the art may be used without departing from the spirit of the invention.

It should be noted that while one example of a graphical user interface 210 has been described above, alternative forms of graphical user interfaces 212, such as for example, graphical user interfaces 212 with alternative display formats, graphical user interfaces 212 with additional word segmentation related features, and/or graphical user interfaces 212 with one of more of the above-described features removed are also considered to be within the scope of the invention.

One embodiment of a method of generating a synchronization list for use with a Chinese word segmentation module includes providing a plurality of potential synchronization list words. A plurality of potential synchronization lists are defined, where each of the plurality of potential synchronization lists includes an associated subset of list words from the plurality of potential synchronization list words. A cost value is determined for each of the potential synchronization lists. The cost value of each potential synchronization list is based on a characteristic of the potential synchronization list and a word segmentation performance parameter associated with potential synchronization list. One of the first plurality of potential synchronization lists is selected as a synchronization list for use with a Chinese word segmentation module based on the determined cost values.

In one embodiment a plurality of Chinese character sequences are provided. Each of the plurality of Chinese character sequences includes an associated plurality of identified words. The Chinese word segmentation module and a first one of the plurality of potential synchronization lists is used to identify a plurality of word segments in the at least one of the plurality of Chinese character sequences. A word segmentation performance parameter associated with the first one of the plurality of potential synchronization lists is determined based on a correspondence between the plurality of identified word segments identified in the at least one of the plurality of Chinese character sequences and the plurality of identified words associated with the at least one of the plurality of Chinese character sequences.

In one embodiment, a plurality of potential synchronization lists are defined by selecting one of the plurality of potential synchronization lists based on an associated cost value and generating a second potential synchronization list including list words from the selected one of the plurality of potential synchronization lists.

In one embodiment, a plurality of potential synchronization list words are provided using a Chinese word source such as for example, including but not limited to, a user specific updated synchronization list, a segmented Chinese document, and a Chinese language dictionary.

In one embodiment, a method of generating a synchronization list includes providing one or more documents including desired segmented Chinese words, a set of potential synchronization words, and a cost function for computing a cost of a potential synchronization list. In one embodiment, the cost function is based on the length of the potential synchronization list and the ability of the Chinese word segmentation module 112 to identify the desired word segments and only the desired word segments in one or more provided documents. When a Chinese word segmentation module 112 uses a potential synchronization list to segment the words in the one or more provided documents, a word segmentation performance parameter is generated for that potential synchronization list. The word segmentation performance parameter is a measure of the ability of a potential synchronization list to identify the desired word segments and only the desired words segments in one or more provided documents. In one embodiment, the Chinese word segmentation module 112 uses a potential synchronization list to segment words in one or more Chinese character sequences, where the Chinese character sequences is segmented into desired word segments. The word segmentation performance parameter is a measure of the ability of a potential synchronization list to identify the desired word segments and only the desired words segments in one or more provided Chinese character sequences. The method further includes generating a synchronization list that substantially minimizes the cost function using an optimization technique. The synchronization list words can be obtained from, for example, a set of documents including Chinese words, and a Chinese language dictionary.

An example of an optimization technique that can be used is a "greedy" or "hill-climbing" approach. In such an approach, an set of initial potential synchronization lists is generated at random from the set of potential synchronization list words. In one embodiment, each of the potential synchronization lists is generated by selecting a predefined number of words at random. In one embodiment each of the potential synchronization list words are generated by looking at each word in turn and selecting it with a predefined probability. This set of initial potential synchronization lists may be thought of as a "population" of potential solutions.

In one embodiment, for each potential synchronization list in the population, a "cost" or "fitness measure" is computed by using the cost function. One component of the cost function is based purely on the set of words contained in the potential synchronization list. In one embodiment, this component is based on the number of words in the potential synchronization list. The cost component may be linear in the number of words, such as for example each word in the potential synchronization list may be assigned a cost of one or some other arbitrary constant. In one embodiment, the cost function is a non-linear function, such as for example, logarithmic, polynomial, or exponential in the number of words. In another embodiment, the cost component is based on the number of characters in the words or the number of bytes required to store or transmit the potential synchronization list.

The second component of the cost function, or word segmentation performance parameter, is based on the word segmentation performance of the potential synchronization list word when the potential synchronization list is used by a Chinese word segmentation module to segment a set of Chinese character sequences from the provided document that includes properly segmented Chinese character sequences. Since the appropriate word segmentation of these Chinese character sequences is known, the word segmentation results achieved when using the potential synchronization list can be compared against the appropriate segmentation of the same Chinese character sequences. In one embodiment, there are two types of errors that weigh against the use of the potential synchronization list as the synchronization list. The potential synchronization list may fail to identify word segments that were in the target and it may identify word segments that were not in the target. These two errors are known respectively as "false negatives" and "false positives". The second component of the cost function, or the word segmentation performance parameter, may be a simple constant penalty for false negatives and false negatives, where the penalties for the two types of errors may be the same or different, or it may be a more complicated function. In one embodiment a cost is assigned for unique words based on the number of times each word is a false positive or false negative. In one embodiment, the second component, or the word segmentation performance parameter, is a sum of the costs due to the different Chinese character sequences tested. In another embodiment, the second component, or the word segmentation performance parameter, is an average or other statistic over the Chinese character sequences tested or documents tested.

In one embodiment, once the two components of the cost function have been computed for a given potential synchronization list, the two components are combined to obtain an overall cost or fitness measure of the potential synchronization list. This combination may be a weighted average or some other arithmetic combination. In one embodiment, the specific combination or the specific weighting used may vary during the course of the optimization. In one embodiment the first and second components of the cost function include a parameter that varies during the course of the optimization.

There is an initial population of potential synchronization lists, and each potential synchronization list has an associated cost or fitness measure. In the hill-climbing approach, the potential synchronization list with the best fitness measure is chosen as the "current" candidate for use as the synchronization list. In one embodiment, "best" means "lowest cost". In another embodiment, higher fitness measures may be preferable.

In one embodiment once a potential synchronization list is selected as a current synchronization list, a new population of potential synchronization lists is generated by taking the current synchronization list and perturbing the current synchronization list by making a relatively small number of additions and deletions. Then the fitness measure for each of these newly-generated potential synchronizations is obtained as for the previous set of potential synchronization lists. If a member of this population of "new" potential synchronization list has a better fitness measure than the current synchronization list, the potential synchronization list with the best fitness measure becomes the new "current" synchronization list. The process iterates until a given amount of walk-clock time has elapsed, a given number of iterations have been taken, a current synchronization list has a fitness measure that is better than some predefined threshold, or there is reason to believe that further significant improvement is unlikely. At this point, the most recent current synchronization list is declared to be synchronization list for use with a Chinese segmentation module 112 to perform word segmentation.

In one embodiment, an evolutionary approach is used. Examples of such an evolutionary approach are genetic algorithms or genetic programming. In an evolutionary approach, an initial population of potential synchronization lists is generated as above and for each potential synchronization list in the population a fitness measure is computed as above. In an evolutionary approach, the potential synchronization lists with relatively better fitness measures are probabilistically chosen to be parents of offspring for the next iteration, and new potential synchronization lists are generated by modifying and combining the parents using operations based on biological genetic operators such as mutation and crossing over. The new population is created in this manner and the process iterates until a termination criterion is reached. During the process, the "best-so-far" potential synchronization list is remembered, and at termination, the most recent best-so-potential synchronization list is declared to be the generated synchronization list for use with a Chinese segmentation module to perform word segmentation. In one embodiment, the cost function used for selecting potential synchronization lists to be parents is different from the cost function used for determining a potential synchronization list to be a new best-so-far potential synchronization list. In one embodiment, the documents or the Chinese character sequences contained within the documents are partitioned into a first subset and a second subset, with the first subset being used to compute the second component of the cost function for the purpose of selecting potential synchronization lists as parents and the second subset being used to compute the second component of the const function for the purpose of determining a potential synchronization list to be a new best-so-far potential synchronization list.

In one embodiment, the potential synchronization lists are not actually be generated. Equations are obtained which mathematically relate the cost functions that would be obtained if the potential synchronization lists were generated to the words that the potential synchronization lists might or might not contain, and mathematical optimization techniques are used to directly find optimal solutions to the equation that minimize the cost function. Examples of such techniques are linear programming, integer programming, and mixed integer programming.

To obtain the set of potential synchronization list words, several techniques may be used. In one embodiment, each identified word in each of the documents is a member of the set of potential synchronization list words. In one embodiment, only those identified words that occur more than a predefined number of times in the documents or in more than a predefined number of documents are members of the set of potential synchronization list words. In one embodiment, the words occurring most frequently or in the greatest number of documents are members of the set of potential synchronization list words. In one embodiment only words shorter than a predefined length are members of the set of potential synchronization list words. In one embodiment, the members of the set of potential synchronization list words are taken from a Chinese dictionary or list of words. In one embodiment the members of the set of potential synchronization list words are taken from the updated synchronization lists 206 constructed by several users as the result of using the graphical user interface 210.

Figure 6:
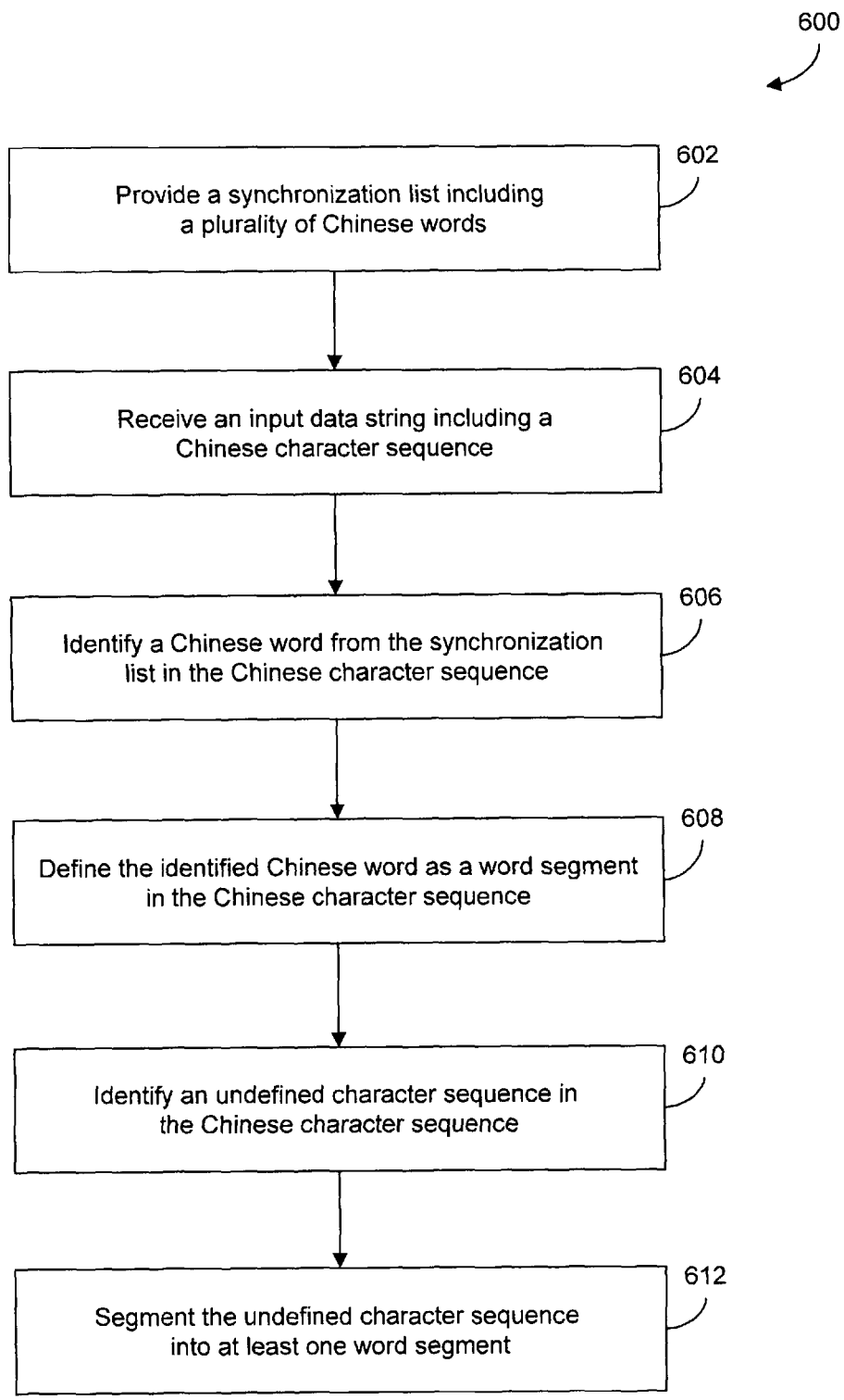
FIG. 6 is a flowchart of one embodiment of a method of splitting a Chinese character sequence into word segments in accordance with the principles of the present invention.

Referring to FIG. 6, a flowchart of one embodiment of a method of splitting a Chinese character sequence into word segments in accordance with the principles of the present invention is shown. A synchronization list 206 including a plurality of Chinese words is provided at step 602 and an input data string including a Chinese character sequence is received for segmentation at step 604. A Chinese word from the synchronization list 206 that is present in the Chinese character sequence is identified at step 606 and the identified Chinese word is defined as a word segment at step 608. At step 610, an undefined character sequence in the Chinese character sequence is identified and the undefined character sequence is segmented into word segments at step 612. It should be noted that while the steps in the method 600 have been described in a particular order, performing one or more of the steps in a different order are also considered to be within the scope of the invention. In another embodiment, a system is provided with the means to implement the steps described above.

In another embodiment, a machine readable medium for stores a machine executable program for splitting a Chinese character sequence into word segments. The machine readable medium includes machine readable code for providing a synchronization list including a plurality of Chinese words, machine readable code for receiving an input data string including a first Chinese character sequence, machine readable code for identifying one of the plurality of Chinese words in the first Chinese character sequence, machine readable code for defining the identified Chinese word as a word segment in the first Chinese character sequence, machine readable code for identifying a first undefined character sequence in the first Chinese character sequence, and machine readable code for segmenting the first undefined character sequence into at least one word segment.

Figure 7:
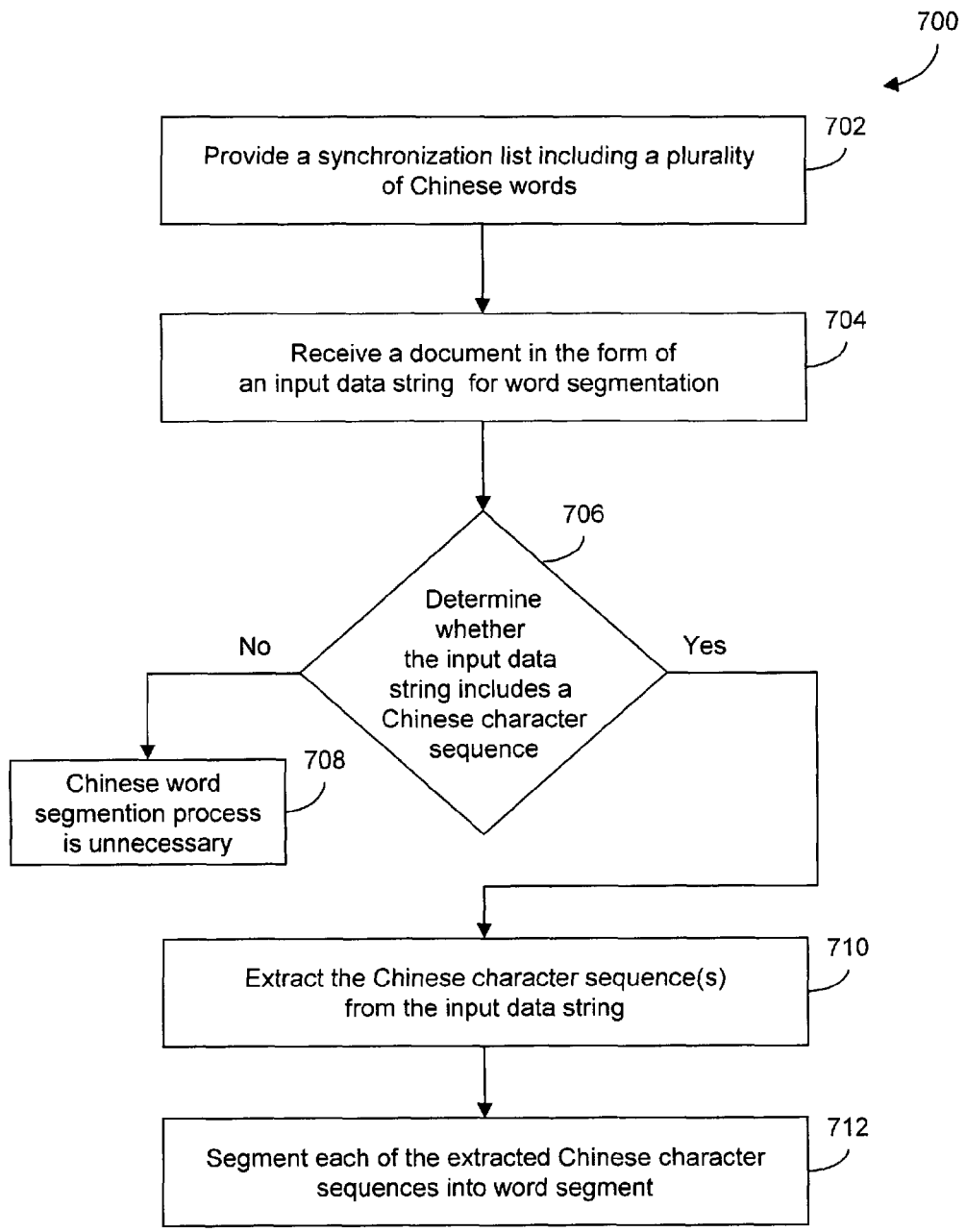
FIG. 7 is a flowchart of another embodiment of a method of splitting a Chinese character sequence into word segments in accordance with the principles of the present invention.

Referring to FIG. 7, a flowchart of another embodiment of a method of splitting a Chinese character sequence into word segments in accordance with the principles of the present invention is shown. The method 700 begins at step 702 with providing a synchronization list 206 including a plurality of Chinese words and receiving a document in the form of an input data string at step 704 for word segmentation at the Chinese word segmentation module 112. The Chinese language identifier 202 determines whether the received input data string includes any Chinese character sequences at step 706. If the Chinese language identifier 202 determines that there are no Chinese character sequences present in the input data string, the Chinese language identifier 202 determines that Chinese word segmentation is not required for the received document at step 708. If the Chinese language identifier 202 determines that the input data string includes at least one Chinese character sequence, the input data string is forwarded to the character sequence extractor 204 and all of the Chinese character sequences that are present in the input data string are extracted from the input data string at step 710. The word segmentor 208 segments each of the extracted Chinese character sequences into word segments at step 712. The one or more words in the Chinese character sequence that match words from the synchronization list 206 are defined as word segments. Words associated with words from the synchronization list 206 present in the Chinese character sequence are defined as word segments. The undefined character sequences in the Chinese character sequence are segmented into two character word segments. If the undefined character sequence includes an odd number of characters, the remaining single character is segmented as a word segment. It should be noted that while the steps in the method 700 have been described in a particular order, performing one or more of the steps in a different order, or performing a subset of the described steps are also considered to be within the scope of the invention.

While the embodiments of the invention disclosed herein are presently considered to be preferred, various changes, and modifications can be made without departing from the spirit and scope of the invention. The scope of the invention is indicated in the appended claims, and all changes that come within the meaning and range of equivalents are intended to be embraced therein.

What is claimed is:

1. A method of splitting a Chinese character sequence into word segments, the method comprising:
   providing a synchronization list including a plurality of Chinese words at a system;
   receiving an input data string including a first Chinese character sequence at the system;
   identifying one of the plurality of Chinese words from the synchronization list in the first Chinese character sequence at the system, wherein the identifying includes,
   comparing the Chinese words in the synchronization list with characters in the first Chinese character sequence;
   detecting a first match between a first Chinese word in the synchronization list and a leftmost or rightmost unsegmented section of the first Chinese character sequence;
   continuing to compare the characters in the first Chinese character sequence against other Chinese words in the synchronization list that begin with the first Chinese word; and
   identifying a longest Chinese word in the synchronization list that matches the leftmost or rightmost unsegmented section of the first Chinese character sequence;
   defining the identified longest Chinese word as a word segment in the first Chinese character sequence at the system;
   identifying a first undefined character sequence in the first Chinese character sequence at the system; and
   segmenting the first undefined character sequence into at least one word segment at the system.

2. The method of claim 1, wherein providing a synchronization list including a plurality of Chinese words at a system comprises providing a synchronization list including a plurality of Chinese number words at the system, the method further comprising:
   identifying a consecutive sequence of at least two Chinese number words from the synchronization list in the first Chinese character sequence at the system; and
   defining the identified sequence of Chinese number words as a word segment at the system.

3. The method of claim 1, wherein providing a synchronization list including a plurality of Chinese words at a system comprises providing a synchronization list including a plurality of Chinese number words and a plurality of Chinese classifier words at the system, the method further comprising:
   identifying one of the plurality of Chinese classifier words in the first Chinese character sequence at the system;
   determining whether the identified classifier word follows one of the plurality of Chinese number words in the first Chinese character sequence at the system; and
   defining the identified Chinese classifier word as a word segment based on the determination at the system.

4. The method of claim 1, wherein providing a synchronization list including a plurality of Chinese words at a system comprises providing a synchronization list including a plurality of Chinese family name words at the system, the method further comprising:
   identifying one of the plurality of Chinese family name words in the first Chinese character sequence at the system; and
   defining the identified Chinese family name word together with the two characters immediately following the identified Chinese family name as a word segment at the system.

5. The method of claim 1, further comprising providing a graphical user interface for receiving user feedback associated with the segmentation of the first Chinese character sequence into word segments at the system.

6. The method of claim 1, wherein receiving an input data string including a first Chinese character sequence at the system further comprises:
   making a first determination regarding whether an input data string is derived from a source document encoded using a first character set that supports representation of Chinese characters and does not support representation of Japanese and Korean characters at the system;
   making a second determination regarding whether the input data string contains characters from a second character set, the second character set including characters corresponding to characters from Unicode Chinese/Japanese/Korean character ranges at the system;
   making a third determination regarding whether the input data string includes a Japanese hiragana character at the system;
   making a fourth determination regarding whether the input data string includes a Japanese katakana character at the system;
   making a fifth determination regarding whether the input data string includes a Korean hangul character at the system;
   making a sixth determination regarding whether external data associated with the input data string provides an indication of whether the input data string includes a first Chinese character sequence at the system; and
   receiving the first input data string based on the first, second, third, fourth, fifth and sixth determinations at the system.

7. The method of claim 1, wherein receiving an input data string including a first Chinese character sequence at the system comprises receiving an input data string including first and second Chinese character sequences at the system, the method further comprising:
   determining whether the input data string includes a data string divider selected from a group consisting of a punctuation symbol, a non-Chinese character, and a mark-up character at the system; and
   extracting the first and second Chinese character sequences from the input data string based on a position of the data string divider within the input data string at the system.

8. The method of claim 1, wherein segmenting the first undefined character sequence into at least one word segment at the system comprises:
   segmenting a single character type of undefined character sequence into a single character word segment at the system;

segmenting an even number character type of undefined character sequence into consecutive two character word segments at the system; and segmenting an odd number character type of undefined character sequence into consecutive two character word segments and a single character word segment at the system.

9. A non-transitory machine readable medium for storing a machine executable program for splitting a Chinese character sequence into word segments, the program comprising a set of instructions to:

provide a synchronization list including a plurality of Chinese words;

receive an input data string including a first Chinese character sequence;

identify one of the plurality of Chinese words from the synchronization list in the first Chinese character sequence, wherein the identifying includes, comparing the Chinese words in the synchronization list with characters in the first Chinese character sequence;

detecting a first match between a first Chinese word in the synchronization list and a leftmost or rightmost unsegmented section of the first Chinese character sequence;

continuing to compare the characters in the first Chinese character sequence against other Chinese words in the synchronization list that begin with the first Chinese word; and identifying a longest Chinese word in the synchronization list that matches the leftmost or rightmost unsegmented section of the first Chinese character sequence;

define the identified Chinese word as a word segment in the first Chinese character sequence;

identify a first undefined character sequence in the first Chinese character sequence; and segment the first undefined character sequence into at least one word segment.

10. The machine readable medium of claim 9, wherein the machine readable code for providing a synchronization list including a plurality of Chinese words comprises machine readable code for providing a synchronization list including a plurality of Chinese number words, the machine readable medium further comprising:

machine readable code for identifying a consecutive sequence of at least two Chinese number words from the synchronization list in the first Chinese character sequence; and machine readable code for defining the identified sequence of Chinese number words as a word segment.

11. The machine readable medium of claim 9, wherein the machine readable code for providing a synchronization list including a plurality of Chinese words comprises machine readable code for providing a synchronization list including a plurality of Chinese number words and a plurality of Chinese classifier words, the machine readable medium further comprising:

machine readable code for identifying one of the plurality of Chinese classifier words in the first Chinese character sequence;

machine readable code for determining whether the identified classifier word follows one of the plurality of Chinese number words in the first Chinese character sequence; and machine readable code for defining the identified Chinese classifier word as a word segment based on the determination.

12. The machine readable medium of claim 9, wherein the machine readable code for receiving an input data string including a first Chinese character sequence further comprises:

machine readable code for making a first determination regarding whether an input data string is derived from a source document encoded using a first character set that supports representation of Chinese characters and does not support representation of Japanese and Korean characters;

machine readable code for making a second determination regarding whether the input data string contains characters from a second character set, the second character set including characters from Unicode Chinese/Japanese/Korean character ranges;

machine readable code for making a third determination regarding whether the input data string includes a Japanese hiragana character;

machine readable code for making a fourth determination regarding whether the input data string includes a Japanese katakana character;

machine readable code for making a fifth determination regarding whether the input data string includes a Korean hangul character;

machine readable code for making a sixth determination regarding whether external data associated with the input data string provides an indication of whether the input data string includes a first Chinese character sequence; and machine readable code for receiving the first input data string based on the first, second, third, fourth, fifth and sixth determinations.

13. The machine readable medium of claim 9, wherein the machine readable code for receiving an input data string including a first Chinese character sequence comprises machine readable code for receiving an input data string including first and second Chinese character sequences, the machine readable medium further comprising:

machine readable code for determining whether the input data string includes a data string divider selected from a group consisting of a punctuation symbol, a non-Chinese character, and a mark-up character; and machine readable code for extracting the first and second Chinese character sequences from the input data string based on a position of the data string divider within the input data string.

14. The machine readable medium of claim 9, wherein the machine readable code for segmenting the first undefined character sequence into at least one word segment comprises:

machine readable code for segmenting a single character type of undefined character sequence into a single character word segment;

machine readable code for segmenting an even number character type of undefined character sequence into consecutive two character word segments; and machine readable code for segmenting an odd number character type of undefined character sequence into consecutive two character word segments and a single character word segment.

15. A method of generating a synchronization list for use with a Chinese word segmentation module, the method comprising:

providing a plurality of potential synchronization list words at a system;

defining a plurality of potential synchronization lists at the system, each of the plurality of potential synchronization lists including an associated subset of list words from the plurality of potential synchronization list words;

determining a cost value for each of the potential synchronization lists at the system, the cost value of each potential synchronization list being based on a characteristic of the potential synchronization list and a word segmentation performance parameter associated with the potential synchronization list, wherein the characteristic of the potential synchronization list is based purely on the set of words contained in the potential synchronization list; and selecting one of the plurality of potential synchronization lists as a synchronization list for use with a first Chinese word segmentation module based on the determined cost values at the system.

16. The method of claim 15, further comprising:

providing a plurality of Chinese character sequences at the system, each of the plurality of Chinese character sequences including an associated plurality of identified words;

using a second Chinese word segmentation module and a first one of the plurality of potential synchronization lists to identify a plurality of word segments in the at least one of the plurality of Chinese character sequences at the system; and determining a word segmentation performance parameter associated with the first one of the plurality of potential synchronization lists based on a correspondence between the plurality of identified word segments identified in the at least one of the plurality of Chinese character sequences and the plurality of identified words associated with the at least one of the plurality of Chinese character sequences at the system.

17. The method of claim 15, wherein defining a plurality of potential synchronization lists at the system comprises:

selecting one of the plurality of potential synchronization lists based on an associated cost value at the system; and generating a second potential synchronization list including list words at the system, the list words from the selected one of the plurality of potential synchronization lists.

18. The method of claim 15, wherein providing a plurality of potential synchronization lists at a system comprises using a Chinese word source selected from a group consisting of a user specific updated synchronization list, a segmented Chinese document, and a Chinese language dictionary at the system.

* * * * *